(No Model.)
L. LOESER.
BRIDLE BLIND.
No. 502,197. Patented July 25, 1893.
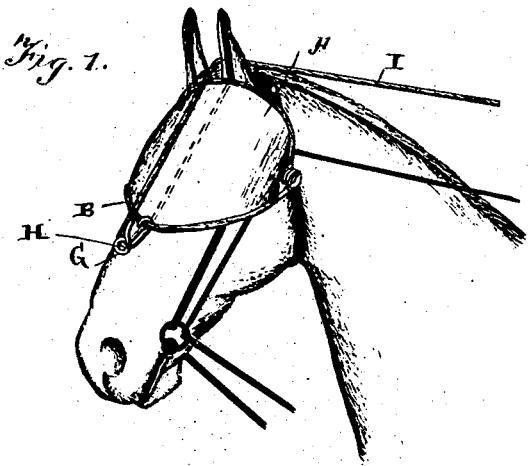
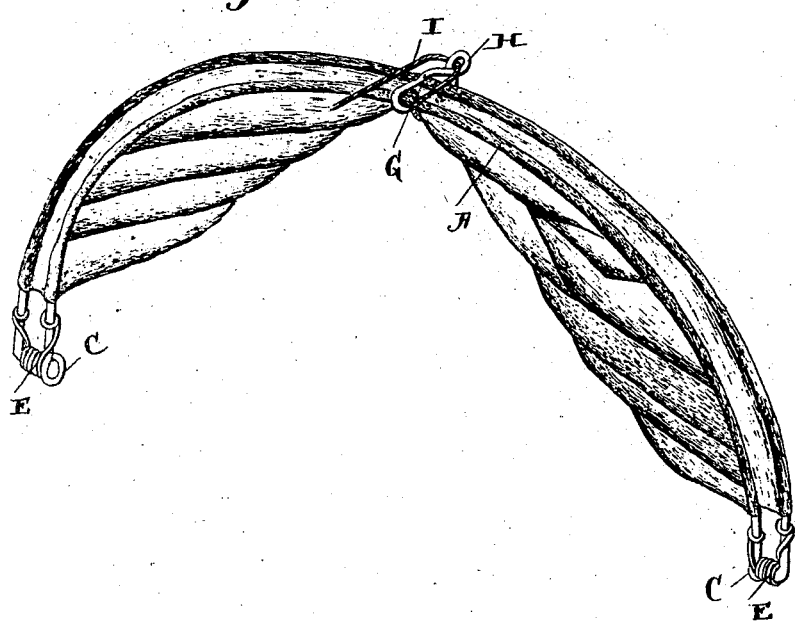

UNITED STATES PATENT OFFICE.

LEO LOESER, OF BUFFALO, NEW YORK.

BRIDLE-BLIND.

SPECIFICATION forming part of Letters Patent No. 502,197, dated July 25, 1893.

Application filed April 22, 1893. Serial No. 471,389. (No model.)

*To all whom it may concern:*

Be it known that I, LEO LOESER, of Buffalo, in the county of Erie and State of New York, have invented certain new and useful Improvements in Blinds for Animals; and I do hereby declare the following to be a full, clear, and exact description of the invention, such as will enable others skilled in the art to which it pertains to make and use it, reference being had to the accompanying drawings, which form part of this specification.

My invention relates to improvements in blinds for animals, and it consists in the construction and arrangement of parts which will be fully described hereinafter and particularly pointed out in the claims.

The object of my invention is to provide a blind for horses which is under the control of the driver to be automatically thrown down in front of the eyes of the horse by the pulling of a string, for the purpose of stopping the animal should he attempt to run away or become frightened; the same being attached to the bridle in the manner hereinafter shown.

In the accompanying drawings:—Figure 1, is a view of a horse's head showing the bridle thereon, and my invention attached thereto. Fig. 2, is an enlarged detached view of my blind fold.

The blind is constructed of two semi-circular portions A, B, which may be made either of wire or flat metal, or any other material, as preferred. The upper portion A has its end provided with the eyes C, and the lower semi-circular portion B has its end turned inwardly and passed through the said eyes with washers or rivets at the inner side of the upper semi-circular portion A, whereby the two portions are pivoted together. Springs E are wound around the laterally extending ends of the lower portion B, and the ends of these springs are connected respectively to the upper and lower portions, so that they are normally held spread, as shown in Fig. 2. A covering of any desired flexible material is attached to the semi-circular portions, as clearly shown in Fig. 2, so that when they are allowed to spring apart the covering is thrown down in front of the eyes of the animal, thus blind-folding him. A hook G has one end loosely connected to the lower semi-circular portion B between its ends, preferably at its center, and provided with an eye H, the opposite end of the said hook being adapted to catch over the upper semi-circular portion when it is closed, as clearly shown in Fig. 2. A cord I has one end attached to the upper portion A and passed around the covering through the eye of the hook and then on to the driver. A pull upon the cord when the blind-fold is open will draw it together and the string or cord is thus wrapped around the two semicircular portions and the covering when they are closed and the hook caught over the semi-circular portion A.

When it is desired to blind-fold the animal, the driver simply pulls upon the cord which lifts the hook from around the upper semi-circular portion and then by releasing the cord the springs throw the lower semi-circular portion downward, as shown, which spreads the covering over the eyes of the animal, and which will cause him to stop should he attempt to run away. When it is desired to close the blind-folds so that the animal can again see, the driver simply draws upon the cord until the hook catches over the upper semi-circular portion, when the two parts are held together and the cord wrapped around them as before described.

From the above description it will be seen that I have produced a very simple device capable of being readily attached to a bridle, and to be quickly and easily operated, as described. The upper semi-circular portion remains stationary, the same being attached at its upper central portion to the brow band L of the bridle, and the lower end thereof being connected to the throat piece M of the said bridle. From this it will be seen that the lower semi-circular portion is the only part which is operated by the springs.

Having thus fully described my invention, what I claim, and desire to secure by Letters Patent, is—

1. A blind of the character described comprising a rigid portion, a swinging semicircular portion pivoted thereto, a spring for normally separating the two portions, a cover connecting them, a holding device connected to the swinging portion intermediate its ends and adapted to engage the rigid portion, and a cord connected with the holding device for closing the swinging portion and operating the holding device, substantially as shown and described.

2. A blind for the purpose described, comprising two semi-circular portions pivotally connected at their ends, a spring for normally holding them apart, a covering attached to the said portions, a hook connected to one of the said portions, and a cord adapted to operate the said hook, substantially as specified.

3. A blind for the purpose described, comprising two semi-circular portions pivotally connected at their ends, springs for normally holding them apart, a cover connected with the said portion, a hook pivotally connected with the movable portion, the said hook having an eye, a cord having one end connected to the stationary portion and passed through the said eye to the driver, substantially as set forth.

4. A blind for the purpose described, comprising two semi-circular portions pivotally connected at their ends, a spring for normally holding them apart, a covering connected to the said portions, the upper portion connected to the bridle, a hook pivotally connected to the lower portion provided with an eye between its ends, a cord attached to the upper stationary portion and passed around behind the covering and under the lower pivoted portion, and thence through the eyes of the hook, substantially as described.

In testimony whereof I affix my signature in presence of two witnesses.

LEO LOESER.

Witnesses:
 CHAS. S. HEYMANN,
 JNO. S. KELLNER.